March 31, 1936.  E. E. COX  2,036,167
METHOD OF MANUFACTURING DISTILLED ALCOHOLIC LIQUORS
Filed April 25, 1935
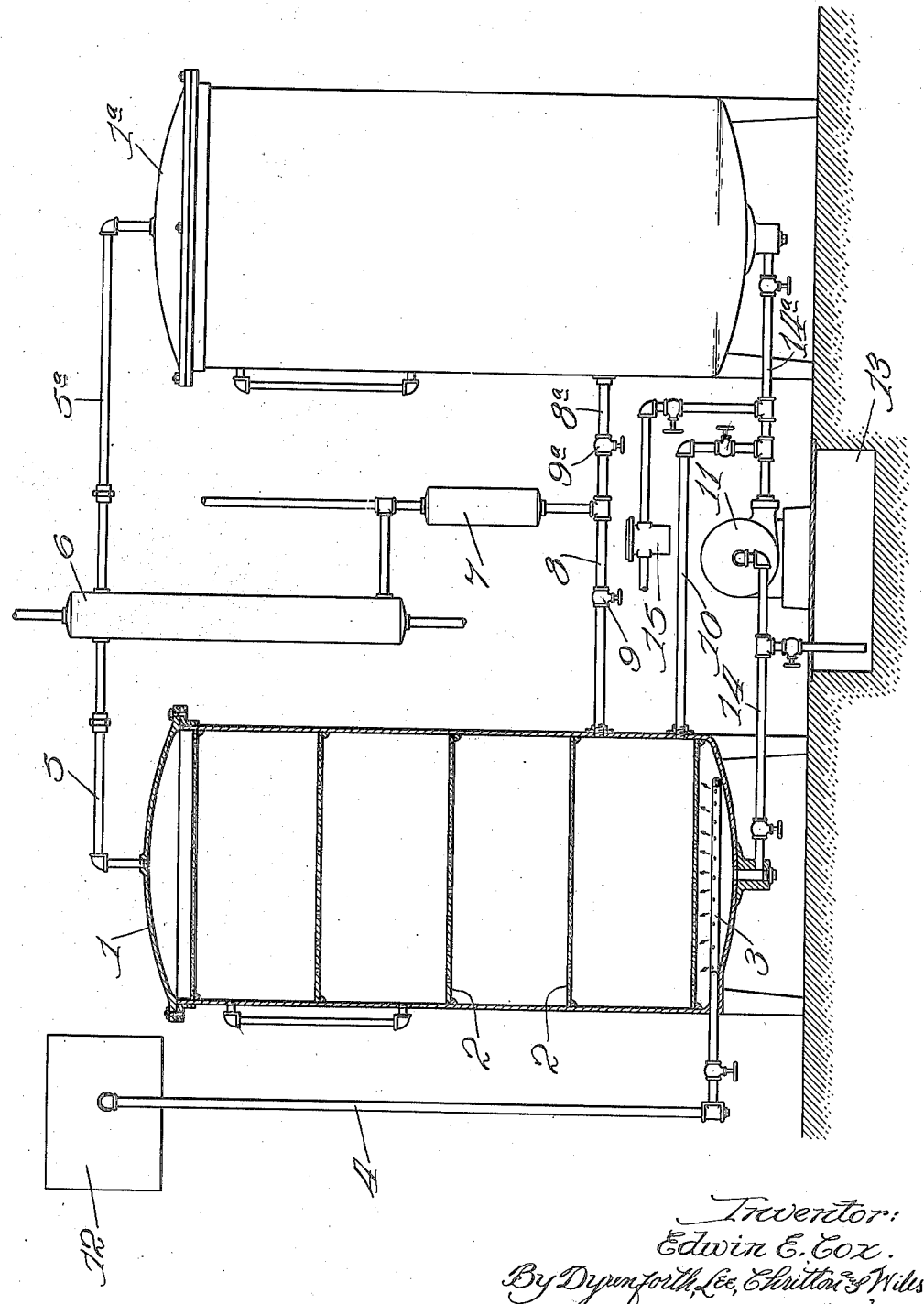
Inventor:
Edwin E. Cox.
By Dyrenforth, Lee, Chritton & Wiles.
Attys.

Patented Mar. 31, 1936

2,036,167

UNITED STATES PATENT OFFICE 2,036,167

METHOD OF MANUFACTURING DISTILLED ALCOHOLIC LIQUORS

Edwin E. Cox, Los Angeles, Calif., assignor to Industrial Laboratories, Ltd., Chicago, Ill., a corporation of Illinois Application April 25, 1935, Serial No. 18,234

9 Claims. (Cl. 202—78)

This invention relates to a method of manufacturing distilled alcoholic liquors and, particularly, to a method of materially accelerating the maturing thereof.

It has been believed for some time that the aging of alcoholic liquors is connected with the oxidation of certain constituents thereof and various means have been proposed for accelerating this oxidation. It has now been discovered that the aging of high alcoholic liquors, such as whiskey, brandy, and the like, consists of two types of oxidation. The first type has heretofore been carefully studied chemically, particularly in the work of the laboratory of the Bureau of Internal Revenue, which work was embodied in a report entitled "The study of the changes taking place in whiskeys stored in wood", by C. A. Crampton and L. M. Tolman, published in volume 30-1, Journal of the American Chemical Society, 1908. The changes embodied in this type of oxidation are primarily the oxidation of alcohols first to aldehydes and then to acids, and the subsequent interaction of acids with alcohol to form esters. At the same time, certain other materials are extracted from the oak containers to furnish the usual whiskey color.

The second type of oxidation or change has now been discovered to occur in what are here entitled the "congeneric" substances of the liquor. These substances are the minute, highly aromatic and flavor-producing materials, hitherto unisolated, which produce the distinctive bouquet of the various whiskeys and other high alcoholic liquors. It is the changes in these materials which produce the matured or softened bouquet of the aged liquor. It has been discovered that the changes in these materials do not readily take place in the presence of an excess of the remaining constituents of the whiskey, and apparently the changes are particularly inhibited by the presence of alcohol. If, however, these congeneric materials be separated, or substantially concentrated, oxidation occurs much more readily.

In accordance with this invention, the congeners are separated from the body of the whiskey, or a concentrate thereof is prepared, and this concentrate then contacted with air in small amounts to carry out the aging process, and the congeners are then returned to the main body of liquor. This treatment materially increases the iodine number and acid value of the congeners and markedly affects the bouquet-producing qualities thereof. The amount of congeners obtainable is so small that detailed chemical analysis thereof has been impossible. However, these substances are oily matters of acid reaction. When cold, the extracted congeners are greasy crystalline white materials. When heated to the melting point, they have a light brown or yellow color. The greasy material has an iodine value of about 27.7 and an acid value of about 34. After treatment as hereinafter described, the iodine number increases to about 36 and the acid value to about 47.

A diagrammatic elevation, with parts in section, of an apparatus for carrying out the invention is illustrated in the drawing, in which—

1 and 1ª represent drums for holding the liquor, which may be of any suitable number or capacity, such as 2500 gallons, means for passing liquor from drum to drum, means for passing air through the drums, and means for condensing so far as possible volatiles contained in the air which has passed through the aerated liquor fraction.

The drums, constructed of any suitable material not affected by spirits, are substantially identical, but the interior construction is shown only for drum 1. The drum is provided with a plurality of screens or perforated plates 2, the perforations of which may be any suitable diameter, for instance, one-quarter inch. Upon the plates are piled any suitable materials which have the property of extracting concentrates of congeneric materials from the liquor. It is preferred to use curled beechwood shavings which have been thoroughly treated to remove all coloring and flavoring matter therefrom. These shavings are readily obtained in commercial quantities. When the drum has been filled as full as conveniently practicable, the shavings will occupy about one-fifth of the volume of the drum. When liquor has been introduced, the shavings will pick up about one-fifth additional volume and will hold about that proportion of liquid. The beechwood shavings appear particularly adapted to separating a concentrate rich in oils, and also are neutral or inert. Other like absorptive materials may be employed.

The drums are provided with means for passing oxygen, or air, through the shavings. This may be done by providing an air spreader 3, which is connected with a source of air which is illustrated diagrammatically by the line 4. The air is preferably heated by passing through an air-heating unit 12. It is not necessary or preferred to use a great amount of air, but on the contrary, only gentle blowing is desired. At the top of the drum, a draw-off line 5 for the air is provided and this line is passed through a water-cooled condenser 6 connected to a liquid receiver 7. The liquid receiver is connected to both drums by the lines 8 and 8ª controlled by valves 9 and 9ª so that the condensate may be introduced into either drum as it is formed. If desired, however, the condensate may be retained and introduced into the final treated liquor before packaging.

Means are also provided for passing liquor from one drum to another. In the drawing, this is illustrated by the lines 14 and 14ª connected to the pump 11. The line 10, metered with meter 15, passes the treated product to the cistern or barreling room when aeration is complete.

In carrying out the operation of the process, raw high-wines are pumped from the reservoir 13 through line 10 into one of the drums, say drum 1, which has been previously filled with shavings, as indicated. The material is allowed to stand in the drum for a period of about one-half hour, or until the shavings are substantially saturated with congeneric materials. The bulk of the high-wines is then pumped into the alternate drum 1ª, leaving upon the shavings an adsorbed concentrate of congeneric substances in the drum 1. The term "concentrate" as here used simply means that the congeneric substances are more concentrated on the shavings than they were in the main body of the liquor. The actual concentration of these substances is extremely small. Air is then passed through the drum in a gentle stream for a short period, say about ½ to 2 hours, preferably about one hour. It is preferred to introduce air at a temperature sufficient that the saturated shavings are maintained at about 80°–90° F. Normally, this may be accomplished by heating the air to about 100° F. The air passing from the drum goes through the condenser 6 and is discharged to the outside air and any condensate is collected in the receiver 7.

The term "high-wines" is used in the whiskey trade to indicate the raw liquor.

The amount of air used is quite small, although the amount thereof may vary widely. It is preferred to keep the amount as small as possible, in order that the amount of congeneric materials carried away in vapor form be reduced to a minimum. After the blowing is complete, the shavings are still wet and no material evaporation has taken place from them.

After this blowing period, the main body of the liquor is pumped from the drum 1ª back into the drum 1 and the concentrate left in the drum 1ª is then blown in the same manner. This process is repeated as often as desired, normally 3 to 5 times. It has been discovered that the maximum efficiency is obtained by blowing for about five to eight hours, although longer periods of blowing may be used, if desired. A preferred range is from 6 to 8 hours. Of course, when the main body of liquid is returned to a drum containing a concentrate already aerated, it should be held there long enough for interchange to take place between the essential oils in the shavings with those in the main body of the liquid. One hour is normally sufficient.

The condensate collected in the receiver 7 will be found to be very high in fusel oils, i. e., (amyl alcohol and other higher alcohols) and in esters; and relatively high in acids. It is important that this material be returned to the liquor.

The distillate or condensate amounts to about one ounce per gallon of material treated. This distillate is found to be extremely concentrated in fusel oil, i. e., amyl alcohol, containing about four times as much as the concentrate. It is also high in aldehydes, including furfural. The acids, however, are low and the esters are about the same as the original material. It is important to return this condensate to the main body of the liquor, inasmuch as it contains a considerable proportion of the essential flavoring and aromatic constituents.

The liquor may then be drawn off from the drums and stored in charred oak barrels of the usual type. These directions are, of course, for American whiskey, and if Scotch whiskey is desired, the barrels need not be charred. After ninety days, whiskey of characteristics and bouquet substantially equal to that of four-year-old whiskey is produced and the acceleration is of about this order all along the line.

The process may be used upon all high alcohol content (distilled) liquors of the whiskey and other types, including but not being limited to Bourbon, rye or Scotch whiskeys, rum, brandy and the like, and is unaffected by whether the mash is sweet or sour. Other methods of separating the congeneric materials from the main body of liquor may be used. The process is particularly adapted to be applied as a step in the movement of the liquor from the doubler to the cistern or barreling room. The step is in no sense rectification since nothing is added to or withdrawn from the liquor, nor is there any mixing of runs, so that no rectification tax is applicable.

As already set forth, the theory upon which the process operates is not thoroughly understood, but it is believed that the congeners which are concentrated in the material left upon the shavings are oxidized in that environment. The effect is entirely different from that accomplished in the ordinary so-called aging processes in which air or oxygen is pumped through an unfractionated body of liquor.

The separation appears to be a matter of surface tension, the oils being adsorbed upon the large surface of the shavings. They thus present an extremely large surface to the air current and readily undergo oxidation.

The foregoing detailed description has been given for clearness of understanding only, and no unnecessary limitations should be understood therefrom, but the appended claims should be construed as broadly as permissible, in view of the prior art.

This case is a continuation in part of my co-pending application 723,267.

What I claim as new, and desire to secure by Letters Patent, is:

1. In the manufacture of distilled alcoholic liquors, the steps of repeatedly contacting raw liquor with curled beechwood shavings for a period of the order of one-half hour, then withdrawing the body of the liquor, contacting the material absorbed upon the shavings with oxygen for a period of the order of one-half hour to oxidize the same without producing substantial evaporation therefrom, returning the main body of liquor to the shavings after the blowing, and aging the so-treated liquor in oak containers.

2. The method as set forth in claim 1, in which the concentration and blowing are repeated from three to five times.

3. The method as set forth in claim 1, in which the oxygen, after contacting the shavings is cooled to produce a condensate of volatile materials from the alcoholic liquor, and the condensate is permanently returned to the liquor.

4. In the manufacture of a distilled alcoholic liquor, the steps of concentrating "congeneric" substances of the liquor upon a solid absorptive material, removing the main body of the liquor from the concentrate, oxidizing "congeneric" substances in the concentrate by contact with a moving stream including gaseous oxygen for a period of at least one-half hour, the period being sufficiently long thoroughly to oxidize the "congeneric" substances, and sufficiently short to avoid evaporating the concentrate to approach dryness, the amount of evaporation being limited to the order of one ounce per gallon of treated liquor during the entire blowing operation, and returning the oxidized concentrate to the main body of liquor.

5. The method as set forth in claim 4, in which the oxygen which has contacted the concentrate is cooled to produce a condensate of material removed from the alcoholic liquor, and the condensate is permanently returned to the main body of liquor.

6. The method as set forth in claim 4, in which the liquor is whiskey.

7. In the manufacture of a distilled alcoholic liquor, the steps of contacting the liquor for a period as long as one-half to two hours with curled beech-wood shavings, removing the main body of liquor, except for absorbed material upon the shavings, contacting the absorbed material with oxygen, to oxidize congeneric substances, for a prolonged period without substantial evaporation therefrom, and returning the main body of the liquor to the so-treated shavings.

8. The method as set forth in claim 7, in which the shavings are gently blown with air for a period of one-half to two hours, and in which the separation of liquor from the shavings and blowing with air are repeated.

9. In the manufacture of a distilled alcoholic liquor, the steps of concentrating "congeneric" substances of the liquor on a solid absorptive material, removing the main body of the liquor from the concentrate, oxidizing "congeneric" substances in the concentrate by contact with a moving stream including gaseous oxygen for a period of at least one hour and not substantially longer than eight hours, whereby the "congeneric" substances are thoroughly oxidized, and returning the oxidized concentrate to the main body of liquor.

EDWIN E. COX.